No. 692,162. Patented Jan. 28, 1902.
T. G. MANDT.
TRUSS ROD SPRING FOR VEHICLES.
(Application filed Aug. 13, 1901.)
(No Model.)
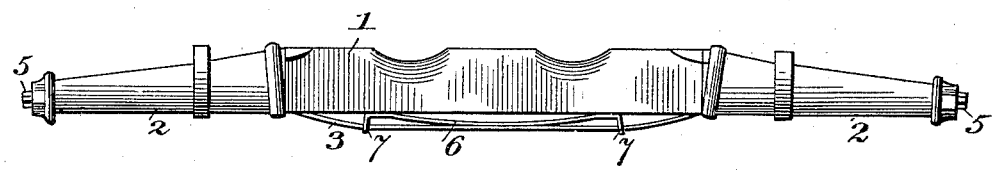
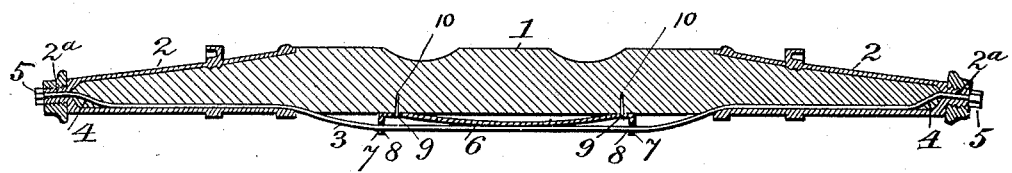
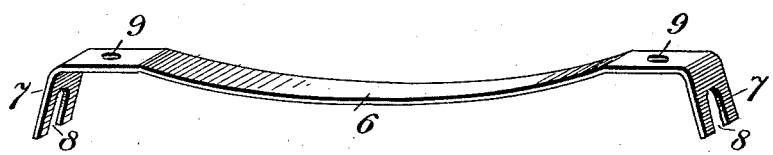
Witnesses:
F. L. Ourand
Frank G. Radelfinger.
Inventor:
Targe G. Mandt,
By Louis Bagger & Co.,
Attorneys.

UNITED STATES PATENT OFFICE.

TARGE G. MANDT, OF STOUGHTON, WISCONSIN.

TRUSS-ROD SPRING FOR VEHICLES.

SPECIFICATION forming part of Letters Patent No. 692,162, dated January 28, 1902.

Application filed August 13, 1901. Serial No. 71,948. (No model.)

*To all whom it may concern:*

Be it known that I, TARGE G. MANDT, a citizen of the United States, residing at Stoughton, in the county of Dane and State of Wisconsin, have invented new and useful Improvements in Truss-Rod Springs for Vehicles, of which the following is a specification.

My invention relates to truss-rod springs; and the object of the same is to provide a spring to be mounted between the truss-rod of a wagon and the axle to prevent the stripping of the threads on the rod or nuts when driving over rough ground or into chuckholes. This is accomplished by the simple and novel construction described in this specification and claimed, and illustrated in the accompanying drawings, forming a part thereof, in which—

Figure 1 is a side elevation of an axle and truss-rod with my spring secured thereto. Fig. 2 is a longitudinal section of the same. Fig. 3 is a perspective of my spring.

Like numerals of reference designate like parts in the different views of the drawings.

The numeral 1 designates a wagon-axle having thimble-skeins 2 thereon. The skeins 2 are apertured at $2^a$ to accommodate a truss-rod 3, passing through diagonal apertures 4 in the axle and fitted with nuts 5 on the outer ends. The portion of the rod 3 intermediate the skeins is bowed downwardly. To normally hold the truss-rod 3 in this position and to also give it a chance to yield when the wagon receives a severe jolt, I mount a bow-spring 6 intermediate the rod 3 and the axle 1. The spring 6 bears centrally its back on the rod 3 and at its ends on the axle 1. The extremes of the spring 6 are turned down to form arms 7, provided with notches 8, which engage the rod 3. The spring 6 is also secured to the axle by nails 10 or bolts passing through apertures 9 near the ends thereof.

From the above-described construction it will now be obvious that the spring 6 will permit the rod 3 to give when the wagon is severely jolted, but will restore it to its initial position when the emergency has passed.

I do not wish to be limited as to details of construction, as these may be modified in many particulars without departing from the spirit of my invention.

Having thus described my invention, what I claim as new, and wish to secure by Letters Patent, is—

In a device of the class described, the combination with an axle and a truss-rod of a bowed spring having downturned notched ends, said spring being mounted with its back centrally on said rod and the said notches engaging the same, substantially as described.

In testimony whereof I have hereunto set my hand in presence of two subscribing witnesses.

TARGE G. MANDT.

Witnesses:
EDWARD F. CAVERLY,
BENNETT S. JONES.